US012309792B2

(12) United States Patent
Asterjadhi et al.

(10) Patent No.: US 12,309,792 B2
(45) Date of Patent: May 20, 2025

(54) GROUP DATA TRANSMISSIONS FOR MULTI-LINK WIRELESS COMMUNICATION DEVICES

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Sai Yiu Duncan Ho, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 17/166,794

(22) Filed: Feb. 3, 2021

(65) Prior Publication Data

US 2021/0282119 A1 Sep. 9, 2021

Related U.S. Application Data

(60) Provisional application No. 62/985,301, filed on Mar. 4, 2020.

(51) Int. Cl.
*H04W 72/04* (2023.01)
*H04W 72/23* (2023.01)
(Continued)

(52) U.S. Cl.
CPC .......... *H04W 72/23* (2023.01); *H04W 76/15* (2018.02); *H04W 76/40* (2018.02)

(58) Field of Classification Search
CPC ..... H04W 72/23; H04W 76/15; H04W 76/40; H04W 72/121; H04W 88/08; H04W 84/12
See application file for complete search history.

(56) References Cited

U.S. PATENT DOCUMENTS 9,379,858 B2* 6/2016 Erceg .................. H04L 27/2602
10,082,557 B1* 9/2018 Chu ....................... G01S 13/765
(Continued)

FOREIGN PATENT DOCUMENTS

TW 201921986 A 6/2019
WO WO-2015127771 A1 9/2015

OTHER PUBLICATIONS

International Search Report and Written Opinion—PCT/US2021/016537—ISA/EPO—May 25, 2021.
Taiwan Search Report—TW110104242—TIPO—Jun. 28, 2024.

*Primary Examiner* — Hoang-Chuong Q Vu
(74) *Attorney, Agent, or Firm* — Holland & Hart / QUALCOMM Incorporated

(57) ABSTRACT

This disclosure provides systems, methods, and apparatuses for wireless communication. An example wireless communication device broadcasts a first beacon frame over a first communication link of an access point (AP) multi-link device (MLD) (AP MLD), and broadcasts a second beacon frame over a second communication link of the AP MLD. The first beacon frame indicates transmission of group data over the first communication link, and the second beacon frame indicates transmission of the group data over the second communication link. The wireless communication device transmits the group data, concurrently over the first and second communication links, to one or more wireless stations (STAs). Another example wireless communication device obtains one or more beacon frames indicating buffered group data in an AP MLD for at least the wireless communication device, selects one or more group communication links, and obtains the group data over the one or more selected group communication links.

16 Claims, 10 Drawing Sheets

(51) Int. Cl.
*H04W 76/15* (2018.01)
*H04W 76/40* (2018.01)

(56) References Cited

U.S. PATENT DOCUMENTS

| | | | | |
|---|---|---|---|---|
| 11,632,817 B2* | 4/2023 | Kim | ................... | H04W 76/15 |
| | | | | 370/338 |
| 2002/0056744 A1* | 5/2002 | Uchida | ................. | G11B 20/18 |
| 2004/0264475 A1* | 12/2004 | Kowalski | ............. | H04W 28/18 |
| | | | | 370/395.5 |
| 2007/0165589 A1* | 7/2007 | Sakoda | ............. | H04W 74/0816 |
| | | | | 370/332 |
| 2007/0201401 A1* | 8/2007 | Benveniste | .......... | H04W 72/20 |
| | | | | 370/329 |
| 2008/0159324 A1* | 7/2008 | Bosch | .................... | H04W 4/06 |
| | | | | 370/432 |
| 2014/0204822 A1* | 7/2014 | Park | ................. | H04W 52/0216 |
| | | | | 370/311 |
| 2016/0037443 A1* | 2/2016 | Kim | ..................... | H04W 48/10 |
| | | | | 455/438 |
| 2018/0083793 A1* | 3/2018 | Kim | ..................... | H04L 12/185 |
| 2018/0132109 A1* | 5/2018 | Lim | ......................... | H04L 1/00 |
| 2018/0213566 A1* | 7/2018 | Baron | .................... | H04W 72/569 |
| 2018/0279362 A1* | 9/2018 | Choi | .................... | H04W 74/04 |
| 2018/0331878 A1* | 11/2018 | Almog | .................... | H04L 1/00 |
| 2019/0028967 A1* | 1/2019 | Ahn | ..................... | H04L 27/0008 |
| 2019/0082373 A1 | 3/2019 | Patil et al. | | |
| 2019/0158385 A1 | 5/2019 | Patil et al. | | |
| 2019/0158993 A1* | 5/2019 | Kwon | .................. | H04L 5/0091 |
| 2019/0364555 A1 | 11/2019 | Huang et al. | | |
| 2020/0221545 A1* | 7/2020 | Stacey | .................. | H04W 48/16 |
| 2020/0396568 A1* | 12/2020 | Huang | .................. | H04W 76/40 |
| 2020/0404737 A1* | 12/2020 | Cariou | .................. | H04W 48/14 |
| 2021/0036819 A1* | 2/2021 | Nam | .................. | H04W 72/563 |
| 2021/0051513 A1* | 2/2021 | Min | ...................... | H04W 72/21 |
| 2021/0068184 A1* | 3/2021 | Chu | ..................... | H04W 80/08 |
| 2021/0076413 A1* | 3/2021 | Lu | ........................ | H04W 74/08 |
| 2021/0076422 A1* | 3/2021 | Akhmetov | .......... | H04W 74/006 |
| 2021/0076437 A1* | 3/2021 | Kneckt | ................. | H04W 76/15 |
| 2021/0105859 A1* | 4/2021 | Hsu | ...................... | H04W 28/06 |
| 2021/0126755 A1* | 4/2021 | Gan | .......................... | H04L 27/20 |
| 2021/0144787 A1* | 5/2021 | Kwon | .................. | H04W 72/23 |
| 2021/0195591 A1* | 6/2021 | Li | ......................... | H04W 16/14 |
| 2021/0212118 A1* | 7/2021 | Lu | ..................... | H04W 74/0816 |
| 2021/0212141 A1* | 7/2021 | Chu | ..................... | H04W 88/10 |
| 2021/0250963 A1* | 8/2021 | Seok | ................. | H04W 74/0816 |
| 2021/0266890 A1* | 8/2021 | Chu | .................... | H04W 74/002 |
| 2022/0408349 A1* | 12/2022 | Kneckt | ................ | H04W 48/16 |
| 2022/0417849 A1* | 12/2022 | Sammour | ......... | H04W 52/0229 |
| 2023/0054755 A1* | 2/2023 | Patil | .................... | H04W 76/15 |
| 2023/0308938 A1* | 9/2023 | Sun | ...................... | H04W 76/20 |
| | | | | 370/230 |

\* cited by examiner

GROUP DATA TRANSMISSIONS FOR MULTI-LINK WIRELESS COMMUNICATION DEVICES

CROSS-REFERENCE TO RELATED APPLICATION

This patent application claims priority to U.S. Provisional Patent Application No. 62/985,301 entitled "GROUP DATA TRANSMISSIONS FOR MULTI-LINK WIRELESS COMMUNICATION DEVICES" filed on Mar. 4, 2020, which is assigned to the assignee hereof. The disclosures of all prior applications are considered part of and are incorporated by reference in this patent application in their respective entireties.

TECHNICAL FIELD

This disclosure relates generally to wireless networks, and more specifically, to group data transmissions for multi-link wireless communication devices.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

To improve data throughput, the AP may communicate with one or more STAs over multiple concurrent communication links. Each of the communication links may be of various bandwidths, for example, by bonding a number of 20 MHz-wide channels together to form 40 MHz-wide channels, 80 MHz-wide channels, or 160 MHz-wide channels. The AP may establish BSSs on any of the different communication links, and therefore it is desirable to improve communication between the AP and the one or more STAs over each of the communication links.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device such as an access point (AP) multi-link device (MLD) (AP MLD). In some implementations, the AP MLD may include a processing system and an interface. The interface may be configured to broadcast a first beacon frame over a first communication link at a start of a first beacon period. The first beacon frame may indicate a transmission of group data over the first communication link during the first beacon period, the broadcast of a second beacon frame over a second communication link at the start of the first beacon period, or both. In some instances, the second beacon frame may indicate a transmission of the group data over the second communication link during the first beacon period. The AP MLD may concurrently transmit the group data to one or more first wireless stations (STAs) and one or more second STAs over the first and second communication links.

In some implementations, the AP MLD includes at least a first AP and a second AP. The first AP may include a first interface configured to transmit the group data over the first communication link. The second AP may include a second AP including a second interface configured to transmit the group data over the second communication link. In some instances, the first interface of the first AP may be further configured to transmit the group data using a first modulation and coding scheme (MCS), and the second interface of the second AP may be further configured to transmit the group data using a second MCS different than the first MCS.

In some other implementations, at least one of the first STAs is a legacy device configured to obtain the group data via the first communication link, and at least one of the second STAs is an Extremely High Throughput (EHT) device configured to obtain the group data via the first communication link, the second communication link, or both. In some instances, the at least one second STA is a single-radio EHT device configured to obtain the group data exclusively via one of the first communication link or the second communication link. In some other instances, the at least one second STA is a multi-radio EHT device configured to obtain the group data concurrently via the first and second communication links.

In some implementations, the processing system of the AP MLD is configured to select a single communication link of the first communication link or the second communication link for transmission of the group data. The interface of the AP MLD also may be configured to transmit an instruction for the at least some of the first or second STAs to obtain the group data over only the selected single communication link. In some instances, the selection is based on obtaining an indication of a preferred communication link from at least one of the first or second STAs. The indication may be contained in a frame or an information element of the frame.

Another innovative aspect of the subject matter described in this disclosure can be implemented as a method for wireless communication. In some implementations, the method may be performed by an apparatus of an AP MLD, and may include broadcasting a first beacon frame over a first communication link at a start of a first beacon period. The first beacon frame may indicate a transmission of group data over the first communication link during the first beacon period, a broadcast of a second beacon frame over a second communication link at the start of the first beacon period, or both. In some aspects, the second beacon frame may indicate a transmission of the group data over the second communication link during the first beacon period. The method also may include transmitting the group data concurrently to one or more first STAs and one or more second STAs.

In some implementations, the method also may include selecting a single communication link of the first communication link or the second communication link for transmission of the group data. The method also may include transmitting an instruction for at least some of the first or second STAs to obtain the group data over the selected single communication link. In some instances, the AP MLD may select the communication link for transmitting group data. In some other instances, one or more of the STAs can select (or at least indicate a preference of) the communication link. The indication may be contained in a frame or an information element of the frame.

Another innovative aspect of the subject matter described in this disclosure can be implemented in a wireless communication device. In some implementations, the wireless communication device may include a processing system and an interface. The interface may be configured to obtain one or more beacon frames from an AP MLD over at least one of a first communication link or a second communication link. The one or more beacon frames may include a DTIM indicating buffered group data. The processing system may be configured to select one or more group communication links for receiving the group data. The group communication links may include at least one of the first communication link or the second communication link. The interface may be further configured to obtain the group data from the AP MLD over the one or more selected group communication links.

In some implementations, the beacon frames may be received as a single beacon frame over a selected one of the first communication link or the second communication link. In some instances, the wireless communication device is a multi-radio Extremely High Throughput (EHT) device. In some other instances, the wireless communication device is a single-radio Extremely High Throughput (EHT) device. In some instances, the interface is further configured to remain on the selected communication link for a duration of a beacon interval.

In some other implementations, the one or more beacon frames may be received separately from one another over each of the first communication link and the second communication link. In some instances, the interface is further configured to obtain the group data over a selected communication link of the first communication link or the second communication link. In some implementations, the interface is further configured to discard the group data received over the non-selected communication link. In some other implementations, the interface is further configured to obtain unicast downlink data over the non-selected communication link.

In some implementations, the one or more group communication links includes each of the first and second communication links. In some instances, the processing system is further configured to selectively combine portions of the group data received over each of the first communication link and the second communication link. In some other implementations, the processing system is further configured to identify duplicate group data among the group data received over each of the first communication link and the second communication link. The interface is further configured to discard the identified duplicate group data. In some instances, the duplicate group data is identified in response to at least one of a transmitter address, a receiver address, or a sequence number of the group data.

In some implementations, the processing system is further configured to select a preferred communication link of the first communication link or the second communication link. The interface may be further configured to transmit an indication of the preferred communication link to the AP MLD in at least one of a frame or an information element. In some other implementations, the interface may be further configured to obtain an instruction to receive the group data over only the selected communication link. The interface also may be configured to obtain the group data over only the selected communication link based on the instruction.

Another innovative aspect of the subject matter described in this disclosure can be implemented as a method for wireless communication. In some implementations, the method may be performed by an apparatus of a wireless communication device, and may include obtaining one or more beacon frames from an AP MLD over at least one of a first communication link or a second communication link. The one or more beacon frames may include a DTIM indicating buffered group data for at least the STA. The method may include selecting one or more group communication links for receiving the group data, the group communication links including at least one of the first communication link or the second communication link. The method may include obtaining the group data from the AP MLD over the one or more selected group communication links.

In some implementations, the beacon frames may be received as a single beacon frame over a selected one of the first communication link or the second communication link. In some instances, the wireless communication device is a multi-radio EHT device. In some other instances, the wireless communication device is a single-radio EHT device. In some instances, the method also includes remaining on the selected communication link for a duration of a beacon interval.

In some other implementations, the one or more beacon frames may be received separately from one another over each of the first communication link and the second communication link. In some instances, the method also includes obtaining the group data over a selected communication link of the first communication link or the second communication link. In some implementations, the method also includes discarding the group data received over the non-selected communication link. In some other implementations, the method also includes obtaining unicast downlink data over the non-selected communication link.

In some implementations, the one or more group communication links includes each of the first and second communication links. In some instances, the method may also include selectively combining portions of the group data received over each of the first communication link and the second communication link. In some other implementations, the method may also include identifying duplicate group data among the group data received over each of the first communication link and the second communication link. The method may also include discarding the identified duplicate group data. In some instances, the duplicate group data is identified in response to at least one of a transmitter address, a receiver address, or a sequence number of the group data.

In some implementations, the method also may include selecting a preferred communication link of the first communication link or the second communication link. The method may include transmitting an indication of the preferred communication link to the AP MLD in a frame or an information element of the frame. In some instances, the selection is based on obtaining an indication of a preferred communication link from at least one of the first or second STAs. The indication may be contained in a frame or an information element of a frame.

In some other implementations, the method also may include obtaining an instruction to receive the group data over only the selected communication link. The method also may include obtaining the group data over only the selected communication link based on the instruction.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
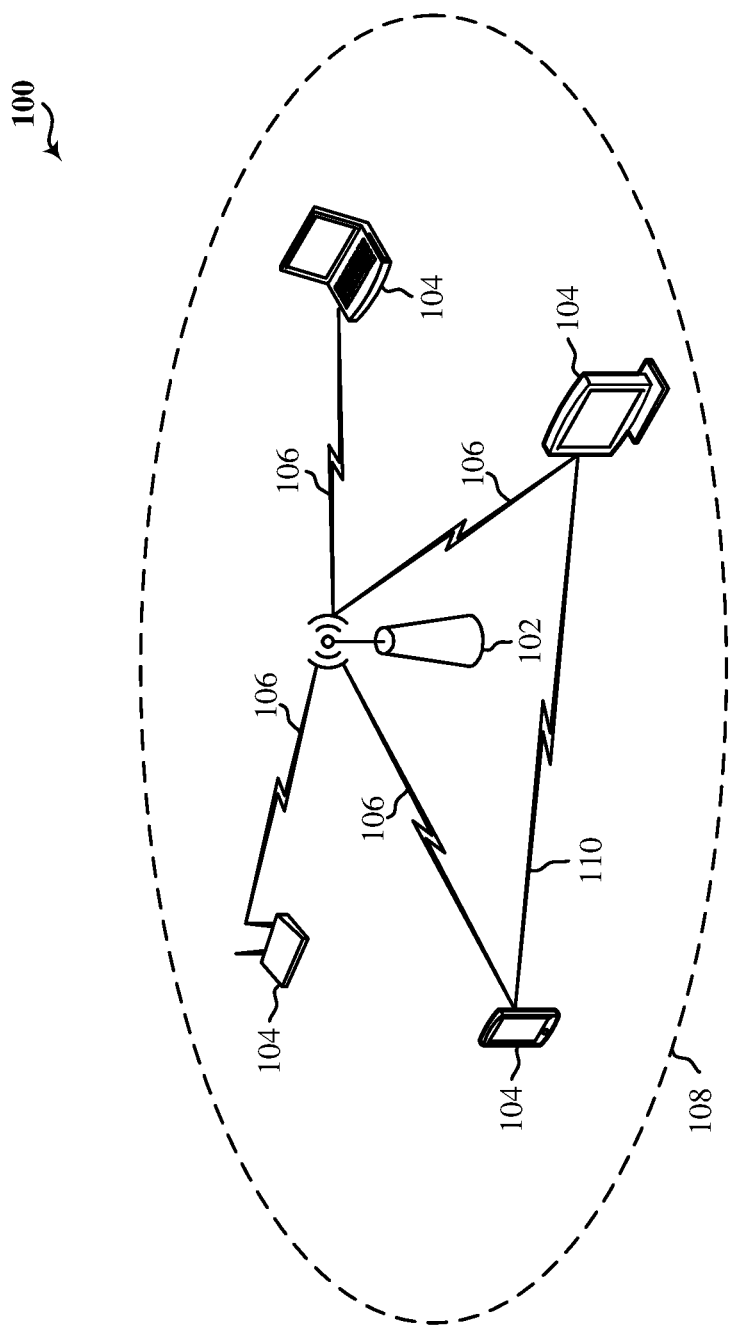
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

An AP periodically broadcasts beacon frames to enable any STAs within wireless range of the AP to establish or maintain a communication link with the WLAN. The STAs may wake from sleep states or low power modes at periodic time intervals such as target beacon transmission times (TBTTs) to receive the beacon frames. The beacon frame may include basic network information, discovery information, capabilities, and the like. Some beacon frames include a traffic indication map (TIM) element indicating the presence of queued downlink (DL) data for one or more of the STAs. Other beacon frames may include a delivery traffic indication map (DTIM) indicating whether the AP has queued DL data scheduled for transmission to one or more of the STAs. In some instances, the DTIM also may indicate the group address for a group of STAs.

Various implementations relate generally to multi-link (ML) communications, and specifically to multi-link devices (MLDs) capable of currently communicating with multiple client devices using a number of different communication links. More specifically, aspects of the present disclosure may be used to increase throughout and reduce latencies in wireless networks configured to operate in accordance with the IEEE 802.11 family of wireless communications standards. Emerging versions of the IEEE 802.11 standards, including the 802.11be EHT amendment, support ML communications. In some implementations, a multi-link association (MLA) context may be shared between different MLDs for a plurality of communication links (or "links"). In some implementations, the MLA context can be shared between the MAC service access point (MAC-SAP) endpoints of MLDs so that the MLDs can dynamically communicate over any link shared between the MLDs without disassociating or re-associating with one another. In this way, the MLA context may allow wireless communication devices that associated with each other on one communication link to use the same association information, negotiation information, link information, security information, encryption keys, capabilities, ML communication parameters, and other parameters or configurations on other communication links of the MLD.

Each MLD may have a unique medium access control (MAC) address, which is also referred to as its MAC-SAP endpoint. One example of an MLD is an AP MLD, which includes multiple APs each capable of communicating on multiple communication links and establishing a BSS on the multiple communication links. Another example of an MLD is a STA MLD, which includes multiple STAs capable of communicating with other devices (such as an AP MLD) on multiple communication links. The STA MLD may have one medium access control physical layer (MAC-PHY) instance for each of the multiple communication links, and the MAC address of each MAC-PHY instance may be the same or different than one another.

An AP MLD may include any suitable number of APs capable of operating on multiple communication links (such as one or more wireless channels in the 2.4 GHz frequency spectrum, one or more wireless channels in the 5 GHz frequency spectrum, or the unlicensed frequency bands in the 6 GHz frequency spectrum). For example, an AP MLD may include a first AP associated with a first communication link, and may include one or more second APs associated with one or more respective second communication links. In some instances, the first communication link may be referred to as the primary communication link, and the second communication links may be referred to as secondary communication links. The AP MLD may increase throughput and reduce congestion of a shared wireless medium by concurrently communicating with multiple STAs using different communication links.

The STAs may reduce power consumption and miss fewer beacon frames on a given communication link of the AP MLD by camping on the given communication link (such as rather than performing off-channel scanning operations to discover other communication links associated with the AP MLD). When a STA camps on a particular communication link of the AP MLD, the STA may not receive beacon frames transmitted on the other communication links associated with the AP MLD. As such, when multiple STAs operate on different communication links of the AP MLD and are organized in the same group (such as for transmissions of queued DL data), it may be difficult to indicate the group address and other grouping information to each of the STAs belonging to the group.

In some implementations, a single communication link of the AP MLD may be selected for transmitting group data to the STAs. In some instances, the AP MLD may select the communication link for group data transmissions. In some other instances, one of the STAs may select the communication link for group data transmissions. The AP MLD may indicate selection of the communication link for group data transmissions to the STAs, for example, by transmitting a frame containing an indication of the selected communication link. In some aspects, the frame also may indicate that single-radio (SR) STAs are to refrain from switching between communication links of the AP MLD for a certain time period after selection of the single communication link for group data transmissions. The time period can be any suitable duration of time including (but not limited to) a beacon interval, a portion of the beacon interval, or a remainder of any beacon interval during which group data is received. In some other implementations, the AP MLD may transmit group data to different STAs over multiple communication links, concurrently. In some aspects, multi-radio (MR) STAs may obtain the group data on one of the communication links while discarding any group data received on the other communication links. In some other aspects, the MR STAs may obtain the group data concurrently on multiple communication links.

Particular implementations of the subject matter described in this disclosure can be implemented to realize one or more of the following potential advantages. When transmitting group data over multiple communication links, an AP MLD may allow a respective STA in a group of STAs to concurrently obtain the group data on the multiple communication links associated with the AP MLD, irrespective of the operating channel or ML capabilities of the respective STA. In some implementations, SR STAs may determine the best available communication link associated with the AP MLD, and may obtain the group data on each of the multiple communication links while discarding duplicate group data. Conversely, when transmitting group data over a single communication link of an AP MLD, the AP MLD may free one or more other communication links of the AP MLD for other users, other traffic types, or other traffic priorities. In some instances, selection of the communication link for transmitting group data may be based at least in part on channel conditions. In some other instances, a user can select the communication link for group data transmissions.

FIG. 1 shows a block diagram of an example wireless communication network 100. According to some aspects, the example wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the example wireless communication network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistants (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication link 106, STAs 104 also can communicate directly with each other via direct wireless links 110. Additionally, two STAs 104 may communicate via a direct communication link regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control, and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
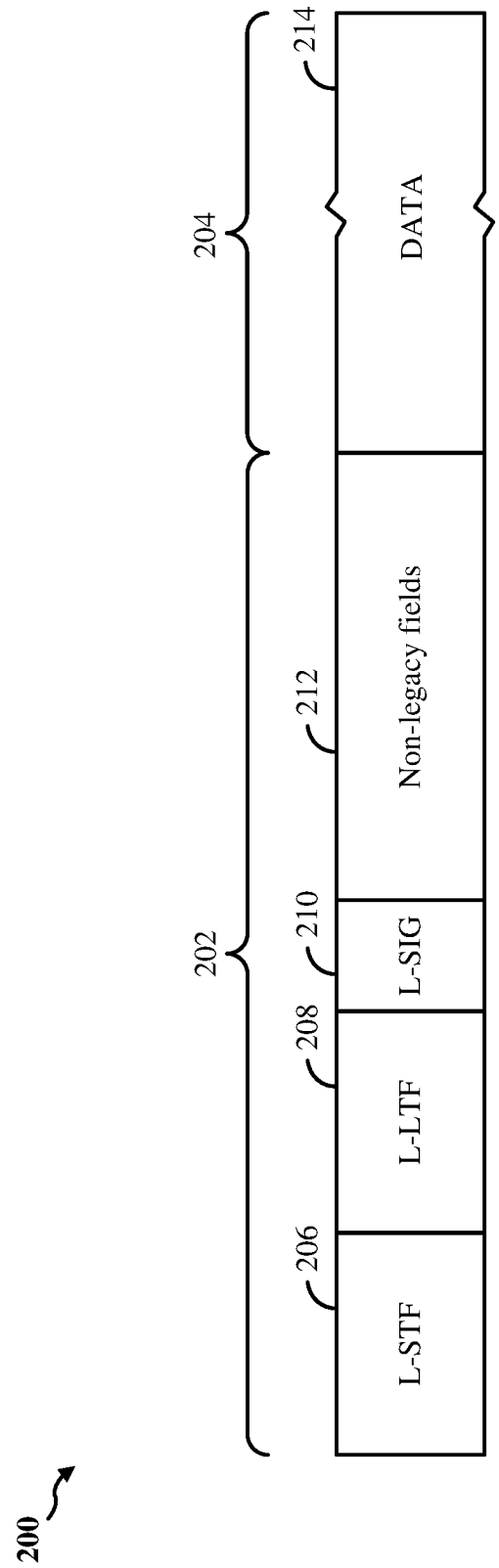
FIG. 2 shows an example protocol data unit (PDU) usable for communications between an access point (AP) and a number of stations (STAs).

FIG. 2 shows an example protocol data unit (PDU) 200 usable for wireless communication between an AP and a number of STAs. For example, the PDU 200 can be configured as a PPDU. As shown, the example PDU 200 includes a PHY preamble 202 and a PHY payload 204. For example, the preamble 202 may include a legacy portion that itself includes a legacy short training field (L-STF) 206, which may consist of two binary phase shift keying (BPSK) symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol, such as the IEEE 802.11ac, 802.11ax, 802.11be, or later wireless communication protocol standards.

The L-STF 206 generally enables a receiving device to perform automatic gain control (AGC) and coarse timing and frequency estimation. The L-LTF 208 generally enables a receiving device to perform fine timing and frequency estimation and also to estimate of the wireless channel. The L-SIG 210 generally enables a receiving device to determine a duration of the PDU and to use the determined duration to avoid transmitting on top of the PDU. For example, the L-STF 206, the L-LTF 208, and the L-SIG 210 may be modulated according to a BPSK modulation scheme. The payload 204 may be modulated according to a BPSK modulation scheme, a quadrature BPSK (Q-BPSK) modulation scheme, a quadrature amplitude modulation (QAM) scheme, or another appropriate modulation scheme. The payload 204 may generally carry higher layer data, for example, in the form of medium access control (MAC) protocol data units (MPDUs) or aggregated MPDUs (A-MPDUs).

Figure 3:
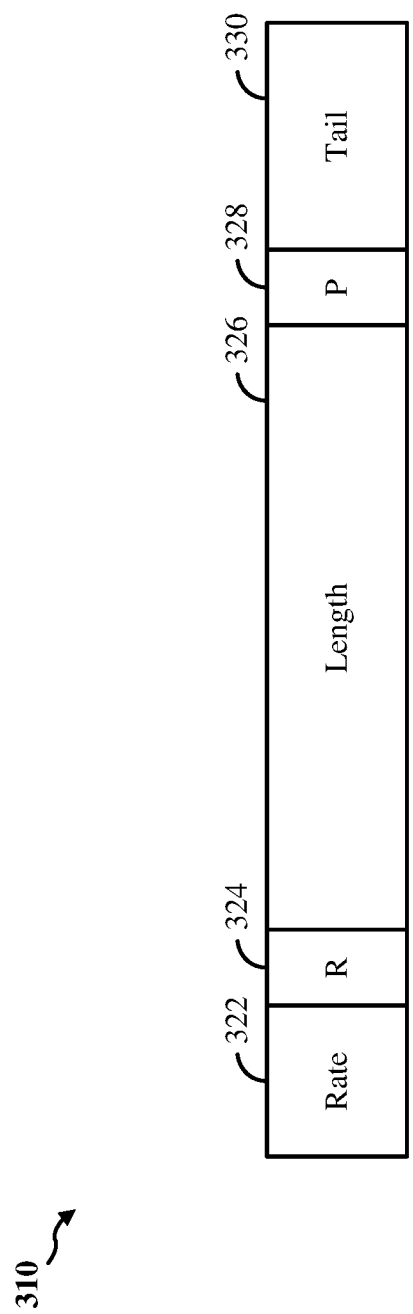
FIG. 3 shows an example field in the PDU of FIG. 2.

FIG. 3 shows an example L-SIG 310 in the PDU 200 of FIG. 2. The L-SIG 310 includes a data rate field 322, a reserved bit 324, a length field 326, a parity bit 328, and a tail field 330. The data rate field 322 indicates a data rate (note that the data rate indicated in the data rate field 322 may not be the actual data rate of the data carried in the payload 304). The length field 326 indicates a length of the packet in units of, for example, symbols or bytes. The parity bit 328 may be used to detect bit errors. The tail field 330 includes tail bits that may be used by the receiving device to terminate operation of a decoder (for example, a Viterbi decoder). The receiving device may utilize the data rate and the length indicated in the data rate field 322 and the length field 326 to determine a duration of the packet in units of, for example, microseconds (µs) or other time units.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing (or packet detection (PD)) is accomplished via a measurement of the received signal strength of a valid frame, which is compared to a value to determine whether the channel is busy. For example, if the received signal strength of a detected preamble is above the value, the medium is considered busy. Physical carrier sensing also includes energy detection (ED). Energy detection involves measuring the total energy the wireless communication device receives regardless of whether the received signal represents a valid frame. If the total energy detected is above a value, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the value.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay, and a MAC processing time. Measurements for channel sensing are performed for each slot. All transmissions may begin at slot boundaries. Example varieties of IFS include: the short IFS (SIFS), the distributed IFS (DIFS), the extended IFS (EIFS), or the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be).

When the NAV reaches 0, the wireless communication device performs physical carrier sensing. If the channel remains idle for the appropriate IFS (for example, a DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from the corresponding STAs 104 to the AP 102). To support the MU transmissions, the APs 102 and the STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52-tone, 106-tone, 242-tone, 484-tone, and 996-tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or an UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs) and may assign each AID (and thus, each STA 104) one or more RUs that can be used to send UL traffic to the AP 102. The AP also may designate one or more random access (RA) RUs that unscheduled STAs 104 may contend for.

Figure 4:
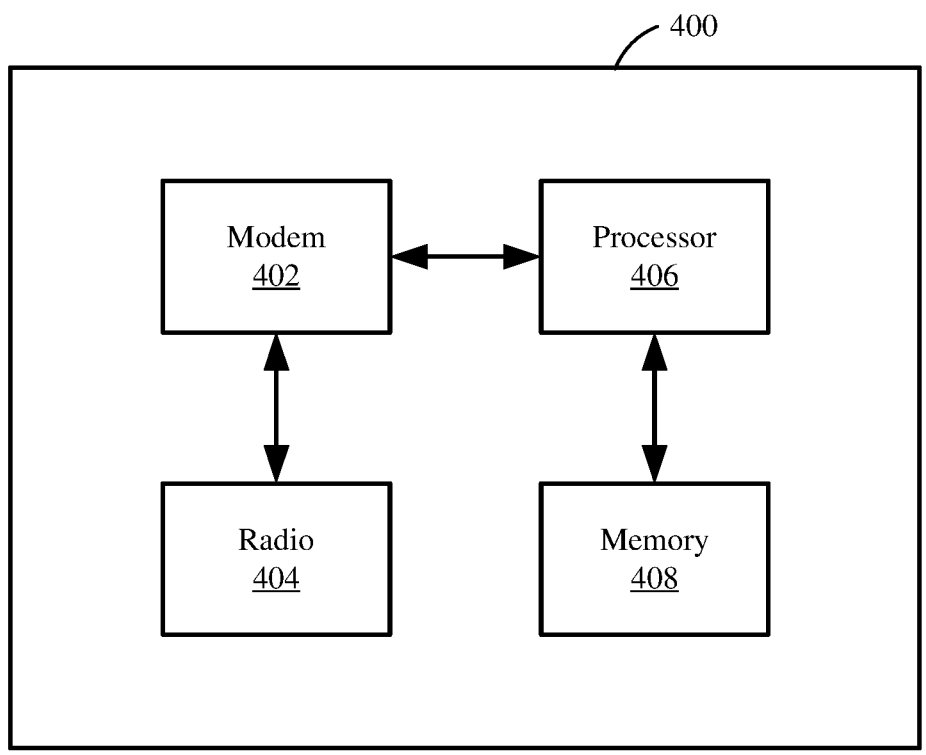
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 400 can be, or can include, a chip, system on chip (SoC), chipset, package, or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks, or processing elements 406 (collectively "the processor 406"), and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer, and a demultiplexer. For example, while in a transmission mode, data obtained from the processor 406 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 406) for processing, evaluation, or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which transmits the symbols via the coupled antennas. Similarly, symbols received via the antennas are obtained by the radio 404, which provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception, and interpretation of MPDUs, frames, or packets. For example, various functions of components disclosed herein, or various blocks or steps of a method, operation, process, or algorithm disclosed herein, can be implemented as one or more modules of one or more computer programs.

Figure 5B:
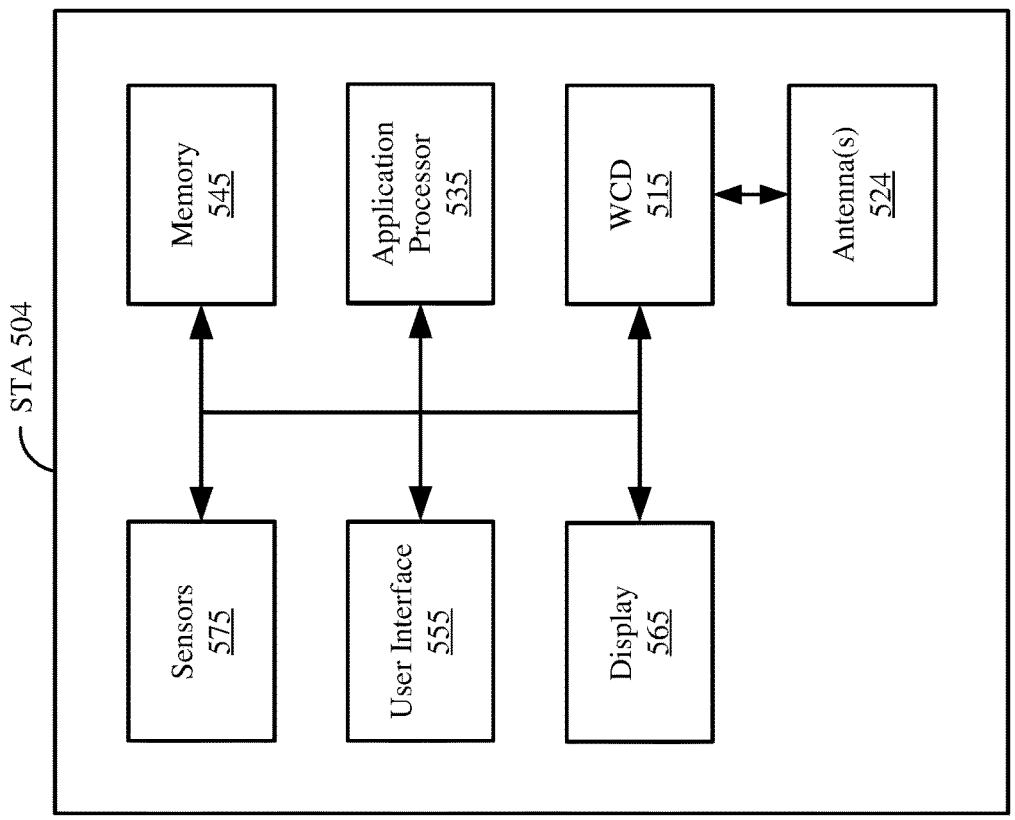
FIG. 5B shows a block diagram of an example STA.
Figure 5A:
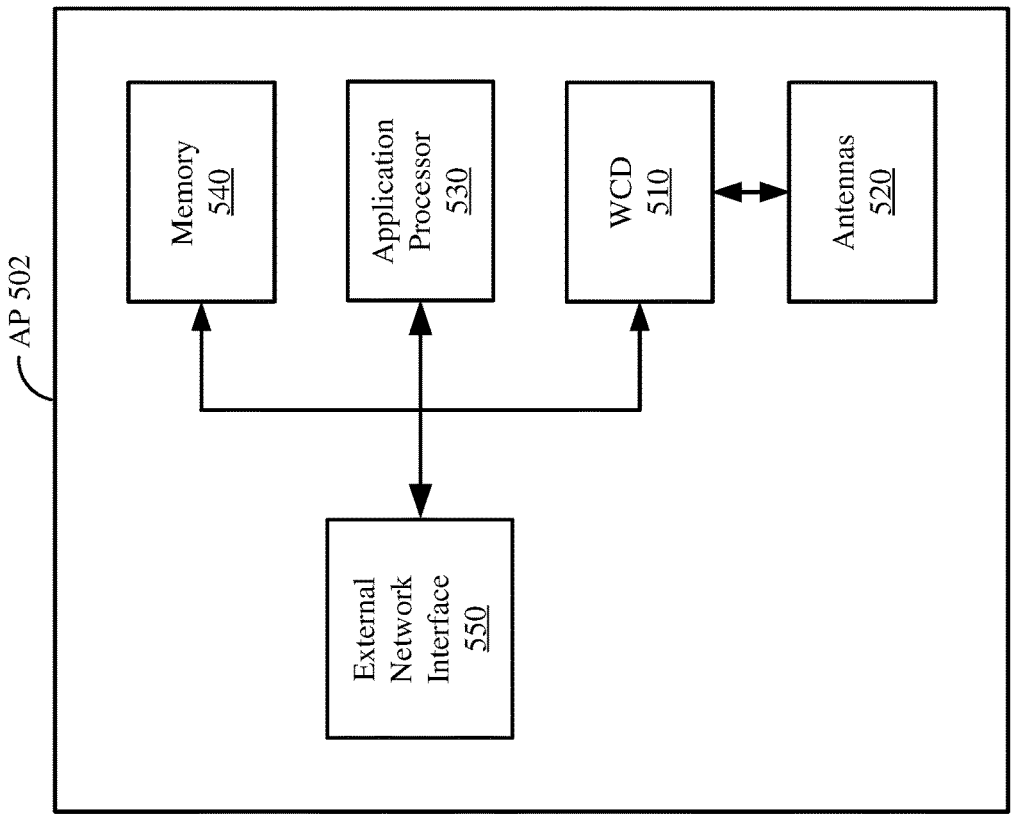
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510. For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Any of the aforementioned components can communicate with other components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515. For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565. In some other implementations, the STA 504 may include a processing system and an interface configured to perform the described functions.

Aspects of the present disclosure provide improved communications for wireless devices configured to operate in accordance with the IEEE 802.11 family of standards. Emerging versions of the IEEE 802.11 standards, including the 802.11be EHT amendment, may support multi-link (ML) communications. In some implementations, a multi-link association (MLA) context may be shared between different multi-link devices (MLDs) for a plurality of communication links (or "links"). In some implementations, the MLA context can be shared between the MAC-SAP endpoints of MLDs so that the MLDs can dynamically communicate over any link shared between the MLDs without disassociating or re-associating with one another. In this way, the MLA context may allow wireless communication devices that associated with each other on one communication link to use the same association information, negotiation information, link information, security information, encryption keys, capabilities, ML communication parameters, and other parameters or configurations on other communication links of the MLD.

For purposes of discussion herein, a MLD also may be referred to as a simultaneous transmit-and-receive (STR) device or an ML device. In some implementations, the AP MLDs and STA MLDs described herein may operate in accordance with the EHT communications defined in the IEEE 802.11be amendment.

A MLD with multiple antennas may be referred to as a multi-radio (MR) device. In some implementations, a MR device with n antennas may be capable of concurrently operating on n communication links. For purposes of discussion herein, a MLD may be "active" on a communication link if the MLD is actively transmitting uplink (UL) data or actively receiving downlink (DL) data on the communication link. In some aspects, MLDs may be associated with any number of communication links at a given time, irrespective of n. For example, a MR STA with three antennas may be capable of concurrently communicating with an AP using the 2.4 GHz frequency spectrum, the 5 GHz frequency spectrum, and the 6 GHz frequency spectrum. In some aspects, the 3-antenna MR STA can actively exchange signals with the AP MLD using the 2.4 GHz frequency spectrum, the 5 GHz frequency spectrum, and the 6 GHz frequency spectrum. For another example, a MR STA with two antennas may be capable of concurrently communicating with an AP using the 2.4 GHz frequency spectrum, the 5 GHz frequency spectrum, and the 6 GHz frequency spectrum. In some aspects, the 2-antenna MR STA can actively exchange signals with the AP MLD using two of the 2.4 GHz frequency spectrum, the 5 GHz frequency spectrum, or the 6 GHz frequency spectrum. A MLD with one antenna, which may be referred to as a single-radio (SR) device, may not be capable of concurrently communicating with an AP using multiple communication links.

For purposes of discussion herein, non-MLDs may be referred to as non-EHT devices or "legacy" devices. In some implementations, legacy devices may operate in accordance with High Throughput (HT), Very High Throughput (VHT), or High Efficiency (HE) communications defined in the IEEE 802.11n, 802.1lac, and 802.11ax amendments. That is, legacy devices may not be capable of operating on one communication link while concurrently operating on another communication link. In some implementations, legacy devices may not be capable of being associated with one or more communication links, such as a 6 GHz channel.

Figure 6:
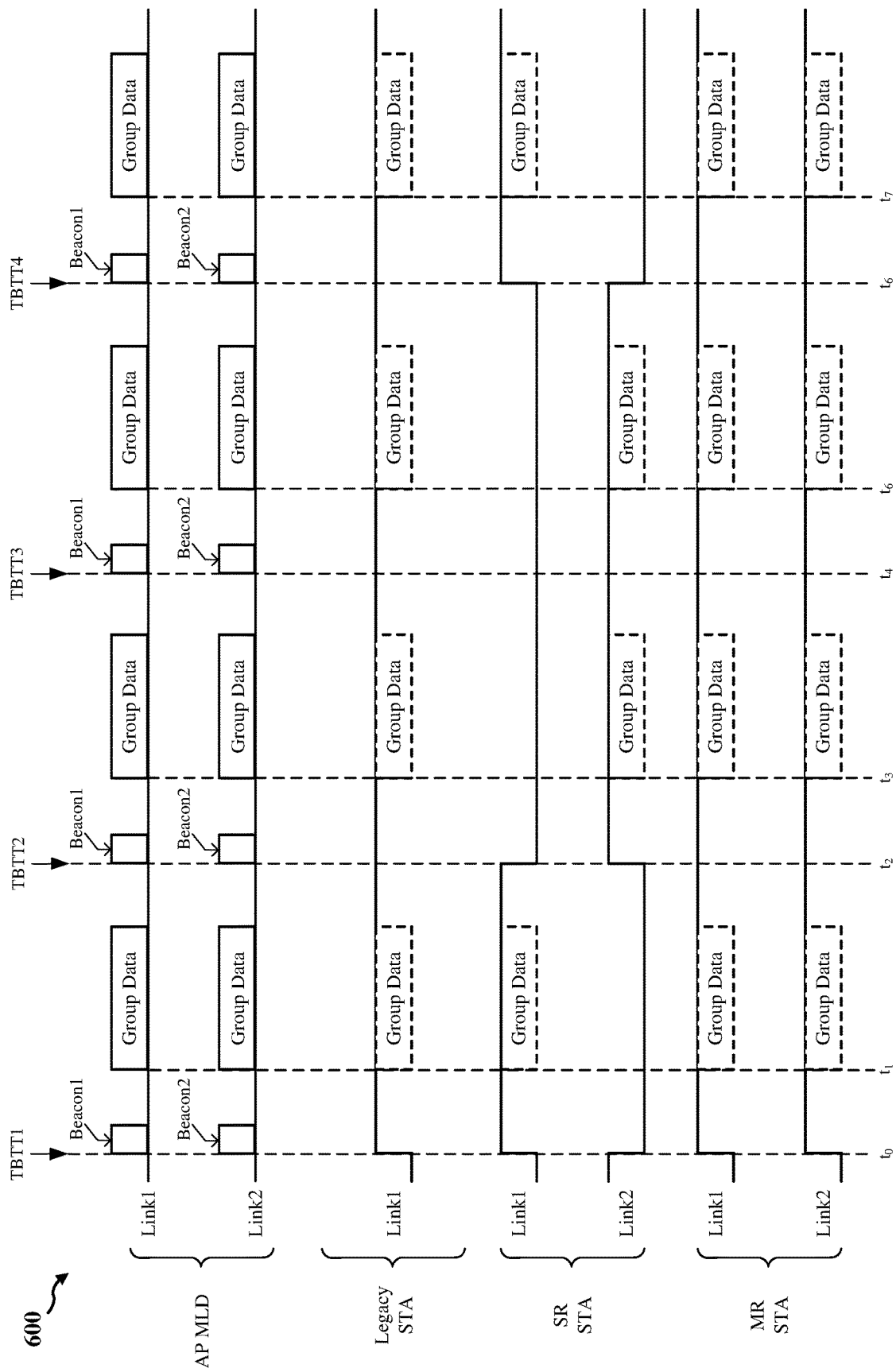
FIG. 6 shows a timing diagram depicting an example operation for wireless communication that supports multi-link communications.

FIG. 6 shows a sequence diagram depicting example operations 600 for wireless communication that supports multi-link communications. In some implementations, the example operations 600 may be performed between an AP and one or more STAs including, but not limited to, a legacy STA, a single-radio (SR) STA, and a multi-radio (MR) STA. The AP may be any suitable AP including, for example, the AP 102 of FIG. 1, the wireless communication device 400 of FIG. 4, or the AP 504 of FIG. 5. In some implementations, the AP may be a multi-link device (MLD) such as an AP MLD. Each of the STAs may be any suitable STA including, for example, one of the STAs 104 of FIG. 1 or the STA 400 of FIG. 4. In some instances, one or more of the STAs may be (or at least a part of) a STA MLD. The STAs may receive the group data on one or more communication links, as is indicated by the dashed rectangles. In some implementations not shown, the AP MLD may include a first AP configured to transmit the group data on Link1 and a second AP configured to transmit the group data on Link2.

The AP MLD may operate on a first communication link ("Link1") and a second communication link ("Link2"). The AP MLD may broadcast a beacon frame on Link1 and Link2 at the start of each beacon period (coinciding with a TBTT). FIG. 6 shows four example beacon periods delineated by TBTT1, TBTT2, TBTT3, and TBTT4, respectively. In the example of FIG. 6, the AP MLD broadcasts a first beacon frame ("Beacon1") on Link1, and broadcasts a second beacon frame ("Beacon2") on Link2 during each beacon period. In some implementations, each beacon frame may include a delivery traffic indication map (DTIM) indicating group data scheduled for transmission on the respective communication link. In the example of FIG. 6, the AP MLD transmits the group data concurrently on Link1 and Link2 during each beacon period. In some instances, the AP MLD may not have group data to transmit during every beacon period. In some aspects, the AP MLD may transmit the group data on Link1 using a first modulation and coding scheme (MCS), and may transmit the group data on Link2 using a second MCS. The first MCS may be different than the second MCS.

In some implementations, the legacy STA may be configured to communicate with the AP MLD via Link1, the SR STA may be configured to communicate with the AP MLD via Link1 or Link2 at any given time, and the MR STA also may be configured to communicate with the AP MLD via Link1 and Link2 concurrently. In the example of FIG. 6, the legacy STA remains active on Link1 during each of the four beacon periods, as indicated by the logic "high" line extending horizontally from the legacy STA. In some implementations, the legacy STA may operate only on Link1, the MR STA may operate concurrently on Link1 and Link2, and the SR STA may dynamically switch between Link1 and Link2, as indicated with logic "high" lines and logic "low" lines, respectively.

At time $t_0$, the AP MLD broadcasts Beacon1 and Beacon2 on Link1 and Link2, respectively. In some implementations, each of Beacon1 and Beacon2 may indicate buffered group data to be transmitted on Link1 and Link2, respectively, at time $t_1$. In some implementations, the availability of group data may be indicated in a DTIM in each beacon frame. Since the MR STA may operate concurrently on Link1 and Link2, the MR STA may concurrently receive Beacon1 and Beacon2 on Link1 and Link2, respectively, at time $t_0$. In some implementations, the SR STA may refrain from switching between communication links for the duration of any beacon interval in which group data is received. As shown, the first beacon period, or DTIM interval, starts at time $t_0$ and ends at time $t_2$.

At time $t_1$, the AP MLD transmits the group data concurrently on Link1 and Link2. In some implementations, the group data may include one or more DL BUs. Also at time $t_1$, the legacy STA, the SR STA, and the MR STA receive the group data transmitted on Link1, and the MR STA receives the group data transmitted on Link2. In some instances, the MR STA may receive duplicate group data. Thus, in some implementations, the MR STA may discard all of the duplicate group data received on Link1 or Link2.

The MR STA may identify the duplicate group data based on matching at least one parameter of the group data received on Link1 to at least one parameter of the group data received on Link2. The at least one parameter may include one or more of a transmitter address (TA), a receiver address (RA), or a sequence number (SN). For example, the MR STA may determine that one or more packets of the group data received on Link1 is a duplicate of one or more packets of the group data received on Link2 based on receiving multiple packets having the same SN. In such instances, the MR STA may discard the duplicate packets. In some implementations, identifying the duplicate group data can include determining the duplicate group data based on matching the at least one parameter of the group data received on Link1 to the at least one parameter of the group data received on Link2.

In some other implementations, the MR STA may identify missing group data from the group data transmitted on one communication link, and recover the missing group data based on group data transmitted on another communication link. For example, the MR STA may identify one or more missing SNs from the group data received on Link1, and may recover the missing group data based on portions of the group data received on Link2 that matches the one or more missing SNs. In this manner, the MR STA may selectively combine portions of the group data received on each of the links. In some implementations, identifying the missing group data can include determining the missing group data from the group data.

At time $t_2$, the AP MLD broadcasts Beacon1 and Beacon2 on Link1 and Link2, respectively. In some implementations, each beacon frame may indicate buffered group data to be transmitted on Link1 and Link2, respectively, at time $t_4$. The SR STA may switch to operating on Link2 to receive Beacon2 at time $t_2$. For example, the SR STA may determine that Link2 offers better quality communications than Link1 at time $t_2$. That is, the SR STA may determine a best available link of Link1 and Link2 for receiving the group data and dynamically switch between Link1 and Link2 between beacon periods. In some aspects, the SR STA may determine that Link1 or Link2 has a higher received signal strength indication (RSSI) or packet error rate (PER) than the other of Link1 and Link2 and therefore the link having the higher RSSI or PER is the best available link for receiving the group data.

At time $t_3$, the AP MLD transmits the group data concurrently on Link1 and Link2. Also at time $t_3$, the legacy STA and the MR STA receive the group data transmitted on Link1, and the SR STA and the MR STA receive the group data transmitted on Link2. In some implementations, the MR STA may discard duplicate group data. In some other implementations, the MR STA may selectively combine portions of the group data received on each of the links.

At time $t_4$, the AP MLD broadcasts Beacon1 and Beacon2 on Link1 and Link2, respectively. In some implementations, the beacon frames transmitted at time $t_4$ indicate buffered group data to be transmitted on Link1 and Link2, respectively, at time $t_5$. The legacy STA and the MR STA may remain on Link1 to receive Beacon1 at time $t_4$.

At time $t_5$, the AP MLD transmits the group data concurrently on Link1 and Link2. Also at time $t_5$, the legacy STA and the MR STA receive the group data transmitted on Link1, and the SR STA and the MR STA receive the group data transmitted on Link2.

At time $t_6$, the AP MLD broadcasts Beacon1 and Beacon2 on Link1 and Link2, respectively. In some implementations, the beacon frames transmitted at time $t_6$ may indicate a transmission of buffered group data on Link1 and Link2, respectively, at time $t_7$. The legacy STA and the MR STA may remain on Link1 to receive Beacon1 at time $t_6$. The SR STA may switch back to operating on Link1 at time $t_6$. For example, the SR STA may determine that Link1 offers better quality communications than Link2 at time $t_6$.

At time $t_7$, the AP MLD transmits the group data concurrently on Link1 and Link2. Also at time $t_7$, the legacy STA, the SR STA, and the MR STA receive the group data transmitted on Link1, and the MR STA receives the group data on Link2.

Figure 7:
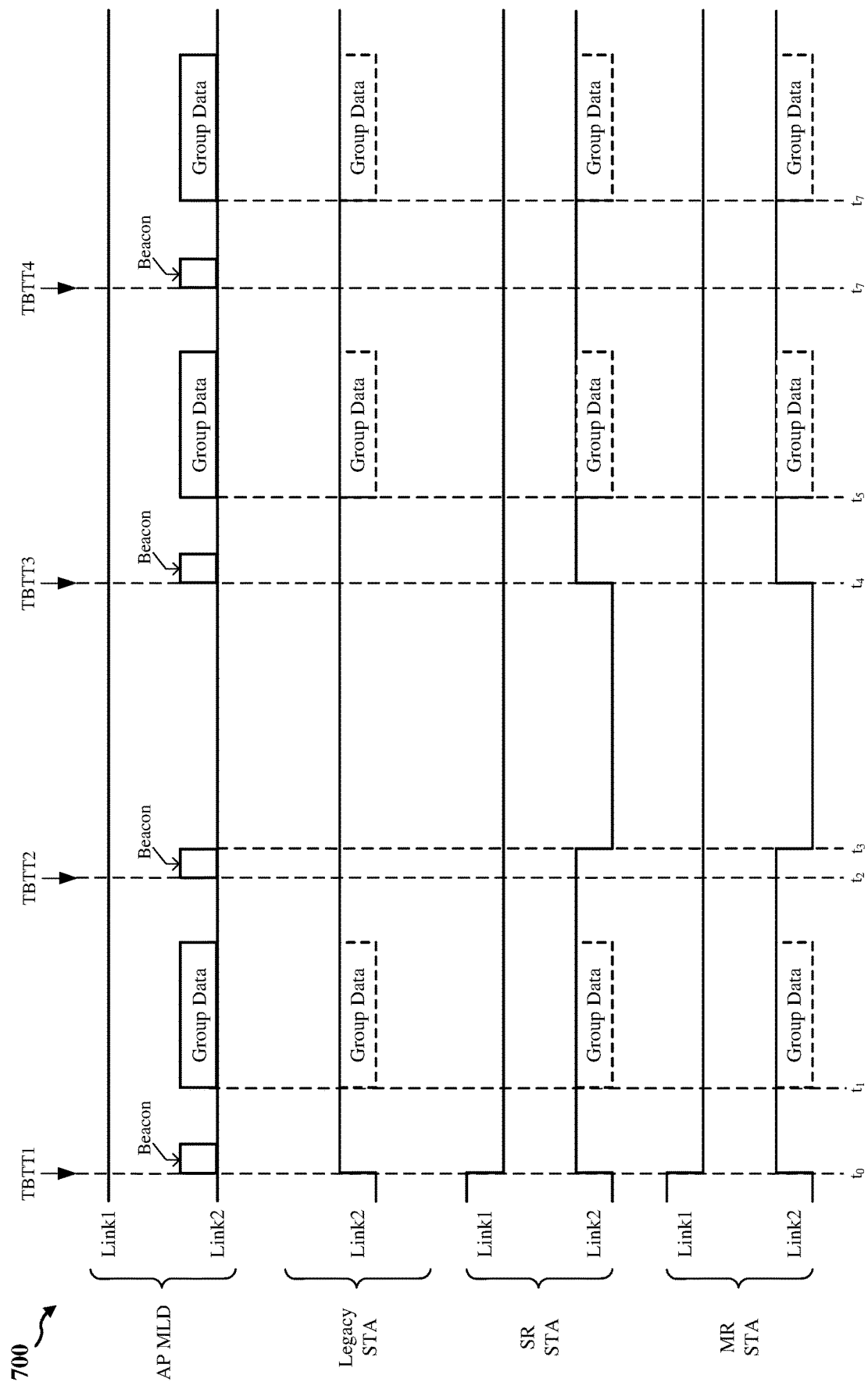
FIG. 7 shows a timing diagram depicting another example operation for wireless communication that supports multi-link communications.

FIG. 7 shows a sequence diagram depicting example operations 700 for wireless communication that supports multi-link communications. In some implementations, the example operations 700 may be performed between an AP and one or more STAs including, but not limited to, a legacy STA, a SR STA, and a MR STA. The AP, the legacy STA, the SR STA, and the MR STA of FIG. 7 may be the same or similar to the AP, the legacy STA, the SR STA, and the MR STA of FIG. 6. In some implementations, the AP may be an AP MLD. In some instances, one or more of the STAs may be (or at least a part of) a STA MLD.

In some implementations, the STAs may receive the group data on one communication link, as indicated by the dashed rectangles. The AP MLD may operate on a first communication link ("Link1") and a second communication link ("Link2"). The AP MLD may broadcast a beacon frame at the start of each beacon period, coinciding with a TBTT. FIG. 7 shows four example beacon periods delineated by TBTT1, TBTT2, TBTT3, and TBTT4, respectively. In the example of FIG. 7, the AP MLD broadcasts a beacon frame ("Beacon") exclusively on Link2 during each beacon period. In some implementations, each beacon frame may include a DTIM indicating group data scheduled for transmission on Link2. In the example of FIG. 7, the AP MLD transmits the group data exclusively on Link2 during the first, third, and fourth beacon period. The AP MLD refrains from transmitting the group data on Link2 during the second beacon period. In some implementations not shown, the AP MLD may broadcast beacons and/or schedule group data on a subset of links.

In some implementations, the legacy STA may be configured to communicate with the AP MLD via Link2, the SR STA may be configured to communicate with the AP MLD via Link1 or Link2 at any given time, and the MR STA also may be configured to communicate with the AP MLD via Link1 and Link2 concurrently. In some implementations not shown, the SR STA may switch to operating on Link1 when the SR STA is not operating on Link2, and the MR STA may switch to operating on Link1 even when operating on Link2.

At time $t_0$, the AP MLD broadcasts the beacon frame on Link2. The beacon frame may indicate buffered group data to be transmitted on Link2 at time $t_1$. Also at time $t_0$, the legacy STA, the SR STA, and the MR STA may receive the beacon frame on Link2.

At time $t_1$, the AP MLD transmits the group data exclusively on Link2. Also at time $t_1$, the legacy STA, the SR STA, and the MR STA receive the group data transmitted on Link2.

At time $t_2$, the AP MLD broadcasts the beacon frame on Link2. The legacy STA, the SR STA, and the MR STA may remain on Link2 to receive Beacon2 at time $t_2$. In the example of FIG. 7, the beacon frame transmitted at time $t_2$ may not indicate buffered group data to be transmitted on Link2 during the second beacon period, such as by not including a DTIM. Thus, one or more of the STAs may enter a doze state after receiving the beacon frame for the remainder of the beacon period, for example, to save power. In the example of FIG. 7, the SR STA and the MR STA enter a doze state at time $t_3$. In some other implementations not shown, the beacon frame transmitted at time $t_2$ may indicate buffered group data to be transmitted on Link2 at time $t_3$.

At time $t_4$, the AP MLD broadcasts the beacon frame on Link2. The beacon frame may include a group address and may indicate buffered group data to be transmitted on Link2 at time $t_5$. Also at time $t_4$, the legacy STA, the SR STA, and the MR STA may receive the beacon frame on Link2.

At time $t_5$, the AP MLD transmits the group data exclusively on Link2. Also at time $t_5$, the legacy STA, the SR STA, and the MR STA receive the group data transmitted on Link2.

At time $t_6$, the AP MLD broadcasts the beacon frame on Link2. In some implementations, the beacon frame transmitted at time $t_6$ may include a group address and may indicate buffered group data to be transmitted on Link2 at time $t_7$. The legacy STA, the SR STA, and the MR STA may remain on Link2 to receive Beacon2 at time $t_6$.

At time $t_7$, the AP MLD transmits the group data exclusively on Link2. Also at time $t_7$, the legacy STA, the SR STA, and the MR STA receive the group data transmitted on Link2.

Figure 8:
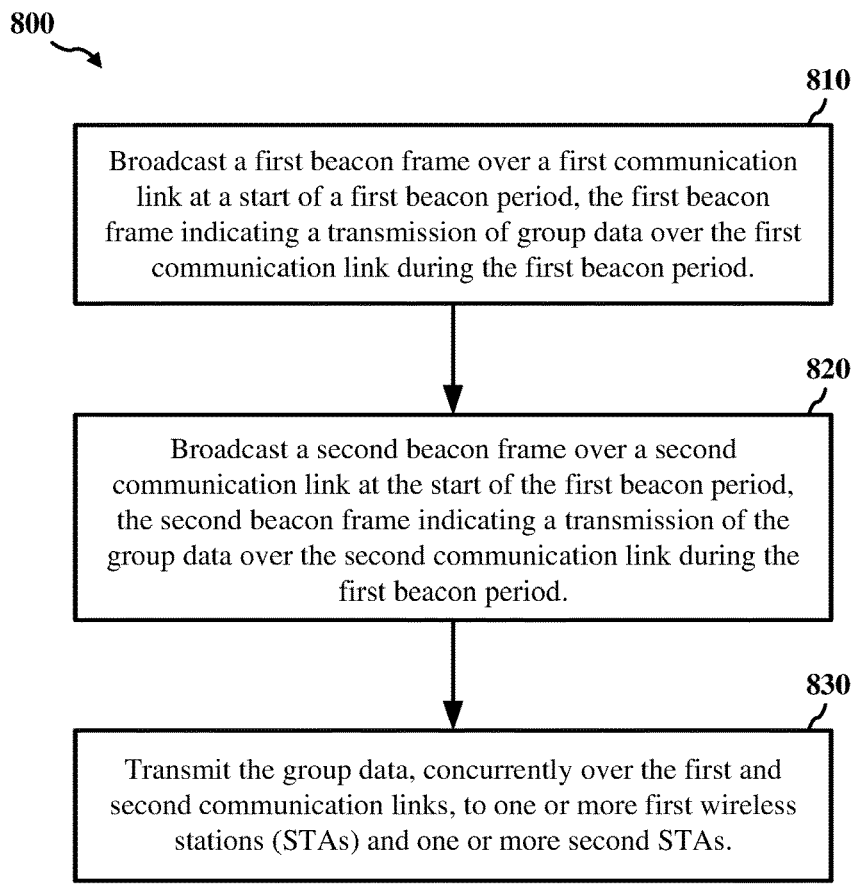
FIG. 8 shows a flowchart illustrating an example operation for wireless communication that supports multi-link communications.

FIG. 8 shows a flowchart illustrating an example operation 800 for wireless communication that supports multi-link communications. In some implementations, the operation 800 may be performed by a wireless communication device operating as or within an AP, such the AP 102 of FIG. 1, the wireless communication device 400 of FIG. 4, or the AP 502 of FIG. 5A. In some instances, the AP may be an AP MLD. In some other implementations, the operation 800 may be performed by a wireless communication device operating as or within a network node.

For example, at block 810, the AP MLD broadcasts a first beacon frame over a first communication link at a start of a first beacon period, the first beacon frame indicating a transmission of group data over the first communication link during the first beacon period. At block 820, the AP MLD broadcasts a second beacon frame over a second communication link at the start of the first beacon period, the second beacon frame indicating a transmission of the group data over the second communication link during the first beacon period. At block 830, the AP MLD transmits the group data, concurrently over the first and second communication links, to one or more first wireless stations (STAs) and one or more second STAs.

In some implementations, the AP MLD may include a first access point including a first interface configured to transmit the group data over the first communication link, and a second AP including a second interface configured to transmit the group data over the second communication link. In some instances, the first interface of the first AP transmits the group data using a first modulation and coding scheme (MCS), and the second interface of the second AP transmits the group data using a second MCS different than the first MCS.

In some other implementations, at least one of the first STAs is a legacy device configured to obtain the group data via the first communication link, and at least one of the second STAs is an Extremely High Throughput (EHT) device configured to obtain the group data via the first communication link, the second communication link, or both. In some instances, the at least one second STA is a single-radio EHT device configured to obtain the group data exclusively via one of the first communication link or the second communication link. In some other instances, the at least one second STA is a multi-radio EHT device configured to obtain the group data concurrently via the first and second communication links.

In some implementations, the AP MLD selects a single communication link of the first communication link or the second communication link for reception of the group data. The AP MLD transmits an instruction for at least some of the first or second STAs to obtain the group data over only the selected communication link. In some instances, selection of the communication link for transmitting group data may be based on communication link preferences indicated by at least one of the first or second STAs. The indication may be contained in a frame or in an information element of a frame.

Figure 9:
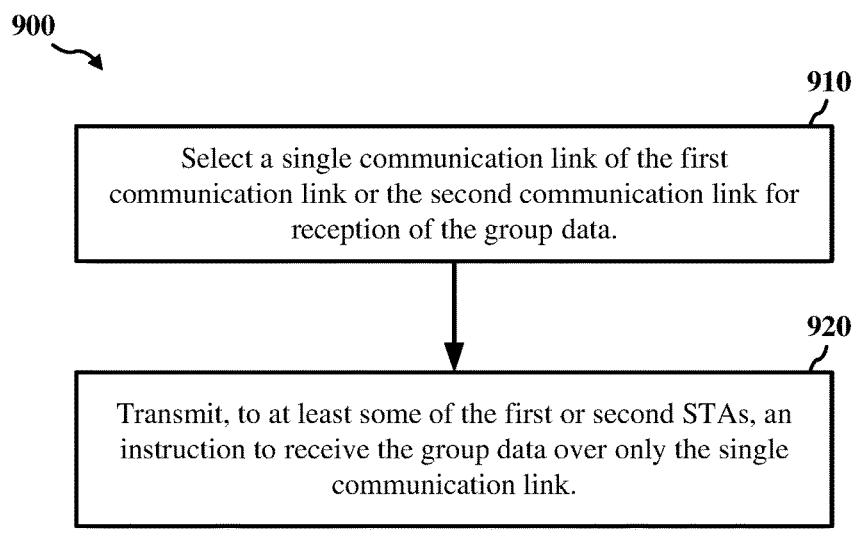
FIG. 9 shows a flowchart illustrating another example operation for wireless communication that supports multi-link communications.

FIG. 9 shows a flowchart illustrating an example operation 900 for wireless communications that supports multi-link communications. In some implementations, the operation 900 may be performed by a wireless communication device operating as or within an AP, such as the AP 102 of FIG. 1, the wireless communication device 400 of FIG. 4, or the AP 502 of FIG. 5A. In some instances, the AP may be an AP MLD. In some other implementations, the operation 900 may be performed by a wireless communication device operating as or within a network node. In some implementations, the operation 900 begins before transmitting the group data at block 830 of FIG. 8.

For example, at block 910, the AP MLD selects a single communication link of the first communication link or the second communication link for reception of the group data. At block 920, the AP MLD transmits an instruction for at least some of the first or second STAs to obtain the group data over only the selected communication link. In some implementations, selection of the communication link for transmitting group data may be based on communication link preferences indicated by one or more of the STAs. In some instances, the indication may be contained in a frame or in an information element of the frame. In some implementations, selecting the single communication link can include determining the single communication link of the first communication link or the second communication link for reception of the group data.

Figure 10:
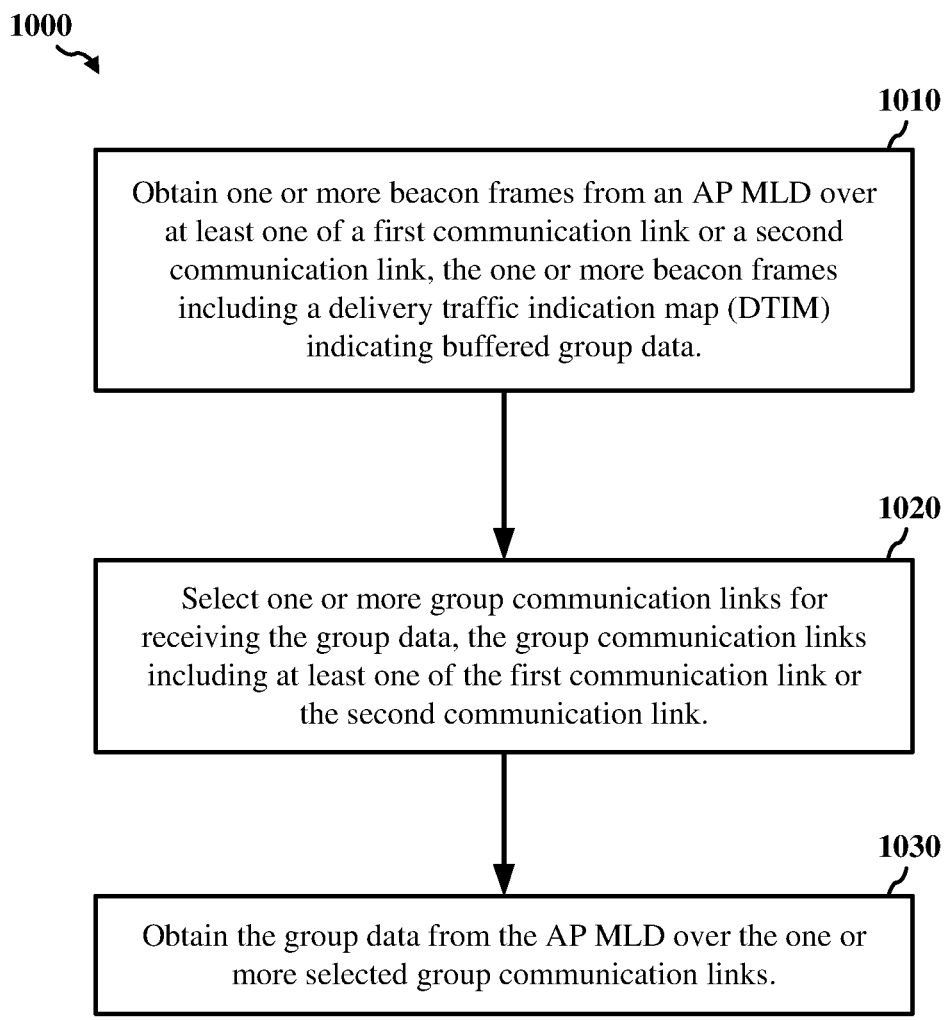
FIG. 10 shows a flowchart illustrating another example operation for wireless communication that supports multi-link communications.

FIG. 10 shows a flowchart illustrating an example operation 1000 for wireless communication that supports multi-link communications. In some implementations, the operation 1000 may be performed by a wireless communication device operating as or within a STA, such as one of the STAs 104 of FIG. 1, the wireless communication device 400 of FIG. 4, or the STA 504 of FIG. 5B. In some instances, the AP may be an AP MLD. In addition, or in the alternative, the STA may be part of a STA MLD. In some other implementations, the operation 1000 may be performed by a wireless communication device operating as or within a network node. For example, at block 1010, the STA obtains one or more beacon frames from an AP MLD over at least one of a first communication link or a second communication link. The one or more beacon frames may include a delivery traffic indication map (DTIM) indicating whether the AP MLD has queued DL data for a group of STAs. At block 1020, the STA selects one or more group communication links for receiving the group data, where the group communication links may include at least one of the first communication link or the second communication link. At block 1030, the STA obtains the group data from the AP MLD over the one or more selected group communication links. In some implementations, selecting the one or more group communication links can include determining one or more group communication links for receiving the group data.

In some implementations, the one or more beacon frames may be obtained or received as a single beacon frame over a selected one of the first communication link or the second communication link. In some instances, the STA is a multi-radio Extremely High Throughput (EHT) device. In some other instances, the STA is a single-radio Extremely High Throughput (EHT) device. In some implementations, the STA remains on the selected communication link for a duration of a beacon interval associated with the single beacon frame.

In some other implementations, the one or more beacon frames may be transmitted separately from one another over each of the first communication link and the second communication link. In some implementations, the STA obtains the group data over a selected communication link of the first communication link or the second communication link. In some instances, the STA discards the group data received over the non-selected communication link. In some other instances, the STA obtains unicast downlink data over the non-selected communication link.

In some implementations, the one or more group communication links includes each of the first and second communication links. In some instances, the STA selectively combines portions of the group data received over each of the first communication link and the second communication link. In some other instances, the STA identifies duplicate group data among the group data received over each of the first communication link and the second communication link. In some aspects, the STA discards the identified duplicate group data. In some implementations, the duplicate group data may be identified based on at least one of a transmitter address, a receiver address, or a sequence number of the group data.

In some other implementations, the STA selects a preferred communication link of the first communication link or the second communication link. The STA transmits an indication of the preferred communication link to the AP MLD in at least one of a frame or an information element. In some implementations, the STA obtains an instruction to receive the group data over only the selected communication link, and obtains the group data over the selected communication link based on the instruction.

Figure 11:
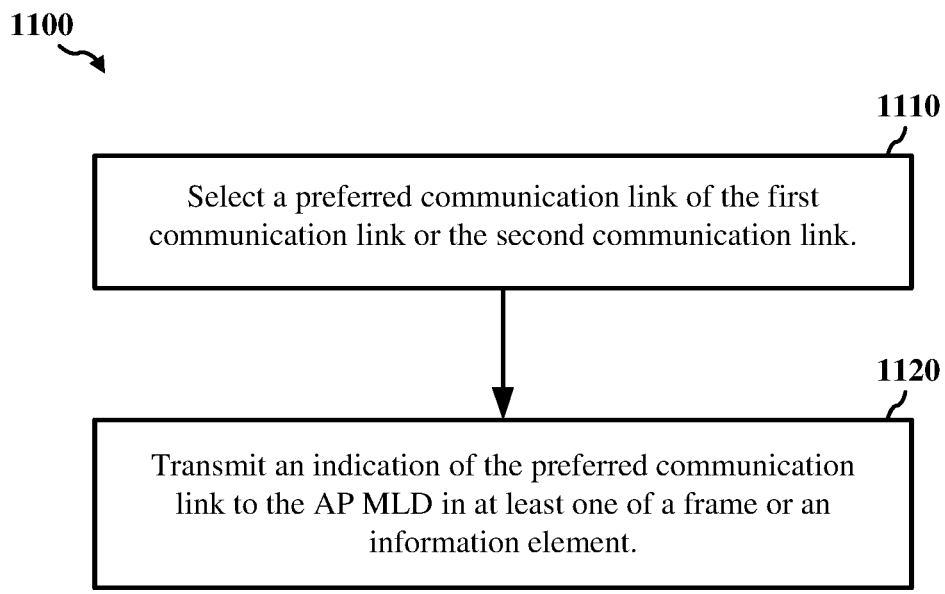
FIG. 11 shows a flowchart illustrating another example operation for wireless communication that supports multi-link communications.

FIG. 11 shows a flowchart illustrating an example operation 1100 for wireless communication that supports multi-link communications. In some implementations, the operation 1100 may be performed by a wireless communication device operating as or within a STA, such as one of the STAs 104 of FIG. 1, the wireless communication device 400 of FIG. 4, or the STA 504 of FIG. 5B. In some other implementations, the operation 1100 may be performed by a wireless communication device operating as or within a network node. In some implementations, the process 1100 begins before selecting the one or more group communications links at block 1020 of FIG. 10. For example, at block 1110, the STA selects a preferred communication link of the first communication link or the second communication link. At block 1120, the STA transmits an indication of the preferred communication link to the AP MLD in at least one of a frame or an information element. In some implementations, selecting the preferred communication link can include determining the preferred communication link.

Figure 12:
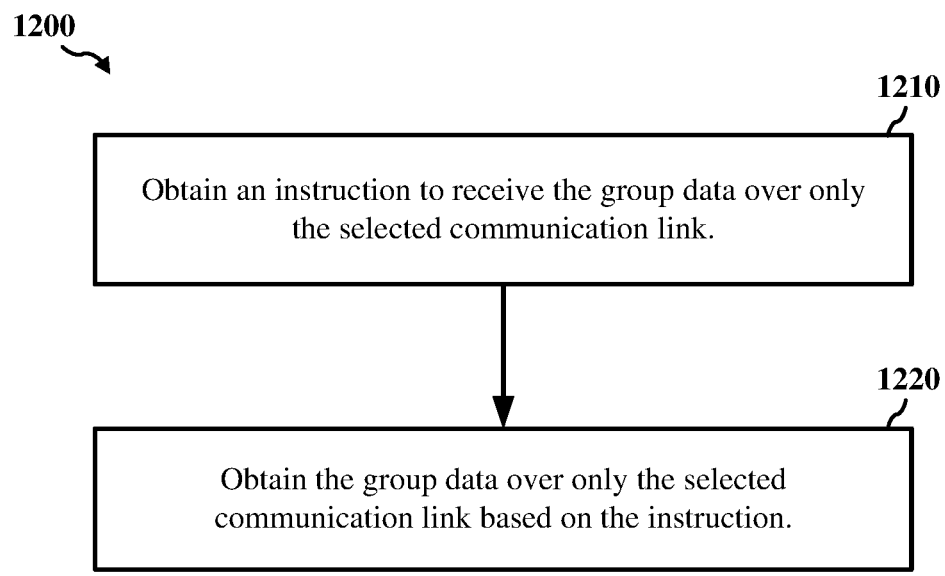
FIG. 12 shows a flowchart illustrating another example operation for wireless communication that supports multi-link communications.

FIG. 12 shows a flowchart illustrating an example operation 1200 for wireless communication that supports multi-link communications. In some implementations, the operation 1200 may be performed by a wireless communication device operating as or within a STA, such as one of the STAs 104 of FIG. 1, the wireless communication device 400 of FIG. 4, or the STA 504 of FIG. 5B. In some other implementations, the operation 1200 may be performed by a wireless communication device operating as or within a network node. In some implementations, the operation 1200 begins before selecting the one or more group communications links at block 1020 of FIG. 10. For example, at block 1210, the STA obtains an instruction to receive the group data over only the selected communication link. At block 1220, the STA obtains the group data over only the selected communication link based on the instruction.

Implementation examples are described in the following numbered clauses:

1. A wireless communication device, including:
   a processing system; and
   an interface configured to:
      broadcast a first beacon frame over a first communication link at a start of a first beacon period, the first beacon frame indicating a transmission of group data over the first communication link during the first beacon period;
      broadcast a second beacon frame over a second communication link at the start of the first beacon period, the second beacon frame indicating a transmission of the group data over the second communication link during the first beacon period; and
      transmit the group data, concurrently over the first and second communication links, to one or more first wireless stations (STAs) and one or more second STAs.
2. The wireless communication device of clause 1, where the wireless communication device is a multi-link device (MLD) including:
   a first access point (AP) including a first interface configured to transmit the group data over the first communication link; and
   a second AP including a second interface configured to transmit the group data over the second communication link.
3. The wireless communication device of clause 2, where:
   the first interface of the first AP is further configured to transmit the group data using a first modulation and coding scheme (MCS); and
   the second interface of the second AP is further configured to transmit the group data using a second MCS different than the first MCS.
4. The wireless communication device of any one or more of clauses 1-3, where at least one of the first STAs is a legacy device configured to obtain the group data via the first communication link, and at least one of the second STAs is an Extremely High Throughput (EHT) device configured to obtain the group data via the first communication link, the second communication link, or both.
5. The wireless communication device of clause 4, where the at least one second STA is a single-radio EHT device configured to obtain the group data exclusively via one of the first communication link or the second communication link.
6. The wireless communication device of clause 4, where the at least one second STA is a multi-radio EHT device configured to obtain the group data concurrently via the first and second communication links.
7. The wireless communication device of any one or more of clauses 1-6, where:
   the processing system is configured to:
      select a single communication link of the first communication link or the second communication link for reception of the group data; and
   the interface is further configured to:
      transmit, to at least some of the first or second STAs, an instruction to receive the group data over only the single communication link.
8. The wireless communication device of clause 7, where the selection is based on obtaining an indication of a preferred communication link from at least one of the first or second STAs, where the indication is contained in at least one of a frame or an information element.
9. A method for wireless communication performed by an apparatus of a wireless communication device, the method including:
   broadcasting a first beacon frame over a first communication link at a start of a first beacon period, the first beacon frame indicating a transmission of group data over the first communication link during the first beacon period;
   broadcasting a second beacon frame over a second communication link at the start of the first beacon period, the second beacon frame indicating a transmission of the group data over the second communication link during the first beacon period; and
   transmitting the group data, concurrently over the first and second communication links, to one or more first wireless stations (STAs) and one or more second STAs.
10. The method of clause 9, further including:
    selecting a single communication link of the first communication link or the second communication link for reception of the group data; and
    transmitting, to at least some of the first or second STAs, an instruction to receive the group data over only the single communication link.
11. The method of clause 10, where the selection is based on obtaining an indication of a preferred communication link from at least one of the first or second STAs, where the indication is contained in at least one of a frame or an information element.

12. A wireless communication device, including:
an interface configured to:
obtain one or more beacon frames from an access point (AP) over at least one of a first communication link or a second communication link, the one or more beacon frames including a delivery traffic indication map (DTIM) indicating buffered group data; and
a processing system configured to:
select one or more group communication links for receiving the group data, the group communication links including at least one of the first communication link or the second communication link; and
the interface is further configured to:
obtain the group data from the AP over the one or more selected group communication links.

13. The wireless communication device of clause 12, where the one or more beacon frames are received as a single beacon frame over a selected one of the first communication link or the second communication link.

14. The wireless communication device of any one or more of clauses 12-13, where the wireless communication device is a multi-radio Extremely High Throughput (EHT) device.

15. The wireless communication device of clause 13, where the wireless communication device is a single-radio Extremely High Throughput (EHT) device.

16. The wireless communication device of clause 13, where the interface is further configured to:
remain on the selected communication link for a duration of a beacon interval associated with the single beacon frame.

17. The wireless communication device of any one or more of clauses 12-16, where the one or more beacon frames are independently received over each of the first communication link and the second communication link.

18. The wireless communication device of clause 17, where the interface is further configured to:
obtain the group data over a selected communication link of the first communication link or the second communication link.

19. The wireless communication device of clause 18, where the interface is further configured to:
discard the group data received over the non-selected communication link.

20. The wireless communication device of any one or more of clauses 18-19, where the interface is further configured to:
obtain unicast downlink data over the non-selected communication link.

21. The wireless communication device of any one or more of clauses 17-20, where the one or more group communication links includes each of the first and second communication links.

22. The wireless communication device of clause 21, where the processing system is further configured to:
selectively combine portions of the group data received over each of the first communication link and the second communication link.

23. The wireless communication device of clause 21, where:
the processing system is further configured to:
identify duplicate group data among the group data received over each of the first communication link and the second communication link; and
the interface is further configured to:
discard the identified duplicate group data.

24. The wireless communication device of clause 23, where the duplicate group data is identified in response to at least one of a transmitter address, a receiver address, or a sequence number of the group data.

25. The wireless communication device of any one or more of clauses 17-24, where the wireless communication device is a multi-radio Extremely High Throughput (EHT) device. The wireless communication device of any one or more of clauses 12-25, where:
the processing system is further configured to:
select a preferred communication link of the first communication link or the second communication link; and
the interface is further configured to:
transmit an indication of the preferred communication link to the AP in at least one of a frame or an information element.

27. The wireless communication device of any one or more of clauses 12-26, where the interface is further configured to:
obtain an instruction to receive the group data over only the selected communication link; and
obtain the group data over only the selected communication link based on the instruction.

28. A method for wireless communication performed by an apparatus of a wireless station (STA), the method including:
obtaining one or more beacon frames from an access point (AP) over at least one of a first communication link or a second communication link, the one or more beacon frames including a delivery traffic indication map (DTIM) indicating buffered group data for at least the STA;
selecting one or more group communication links for receiving the group data, the group communication links including at least one of the first communication link or the second communication link; and
obtaining the group data from the AP over the one or more selected group communication links.

29. The method of clause 28, further including:
selecting a preferred communication link of the first communication link or the second communication link; and
transmitting an indication of the preferred communication link to the AP in at least one of a frame or an information element.

30. The method of any one or more of clauses 28-29, further including:
obtaining an instruction to receive the group data over only the selected communication link; and
obtaining the group data over only the selected communication link based on the instruction.

As used herein, a phrase referring to "at least one of" a list of items refers to any combination of those items, including single members. As an example, "at least one of: a, b, or c" is intended to cover: a, b, c, a-b, a-c, b-c, and a-b-c. The term "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An access point (AP) multi-link device (MLD) (AP MLD), comprising:
   one or more processors; and
   one or more memories storing instructions that, when executed by the one or more processors, are configured to cause the AP MLD to:
   broadcast a first beacon frame over a first communication link via a first AP of the AP MLD at a start of a first beacon interval, the first beacon frame indicating a transmission of group data over the first communication link during the first beacon interval;
   broadcast a second beacon frame over a second communication link via a second AP of the AP MLD at the start of the first beacon interval in accordance with the first AP of the AP MLD and the second AP of the AP MLD being associated with a same set of target beacon transmission times (TBTTs) across the first communication link and the second communication link, the second beacon frame indicating a transmission of the group data over the second communication link during a time period that at least partially overlaps with the first beacon interval; and
   transmit the group data, over the first communication link and the second communication link, to a wireless station (STA) and an MLD associated with one or more STAs in accordance with the first beacon frame and the second beacon frame indicating the transmission of the group data over the first communication link and the second communication link, respectively, wherein one or more first packets of the group data transmitted over the first communication link have a same sequence number as one or more second packets of the group data transmitted over the second communication link.

2. The AP MLD of claim 1, wherein:
   the first AP comprises a first interface configured to transmit the group data over the first communication link; and
   the second AP comprises a second interface configured to transmit the group data over the second communication link.

3. The AP MLD of claim 2, wherein:
   the first interface of the first AP is further configured to transmit the group data using a first modulation and coding scheme (MCS); and
   the second interface of the second AP is further configured to transmit the group data using a second MCS different than the first MCS.

4. The AP MLD of claim 1, wherein the group data is transmitted to the wireless STA via the first communication link, and the group data is transmitted to the MLD associated with the one or more STAs via the first communication link, the second communication link, or both, and wherein the wireless STA is a non-MLD and is not capable of multi-link communication, and the MLD associated with the one or more STAs is capable of multi-link communication.

5. The AP MLD of claim 1, wherein the MLD associated with the one or more STAs is a single-radio EHT device configured to obtain the group data exclusively via one of the first communication link or the second communication link.

6. The AP MLD of claim 1, wherein the MLD associated with the one or more STAs is a multi-radio EHT device configured to obtain the group data concurrently via the first communication link and the second communication link.

7. A method for wireless communication performed by an apparatus of an access point (AP) multi-link device (MLD) (AP MLD), the method comprising:
broadcasting a first beacon frame over a first communication link via a first AP of the AP MLD at a start of a first beacon interval, the first beacon frame indicating a transmission of group data over the first communication link during the first beacon interval;
broadcasting a second beacon frame over a second communication link via a second AP of the AP MLD at the start of the first beacon interval in accordance with the first AP of the AP MLD and the second AP of the AP MLD being associated with a same set of target beacon transmission times (TBTTs) across the first communication link and the second communication link, the second beacon frame indicating a transmission of the group data over the second communication link during a time period that at least partially overlaps with the first beacon interval; and
transmitting the group data, over the first communication link and the second communication link, to a wireless station (STA) and an MLD associated with one or more STAs in accordance with the first beacon frame and the second beacon frame indicating the transmission of the group data over the first communication link and the second communication link, respectively, wherein one or more first packets of the group data transmitted over the first communication link have a same sequence number as one or more second packets of the group data transmitted over the second communication link.

8. A wireless communication device, comprising:
one or more processors; and
one or more memories storing instructions that, when executed by the one or more processors, are configured to cause the wireless communication device to:
obtain a first beacon frame from an access point (AP) multi-link device (MLD) (AP MLD) over a first communication link at a start of a first beacon interval, the first beacon frame including a delivery traffic indication map (DTIM) indicating a transmission of group data over the first communication link during the first beacon interval;
obtain a second beacon frame from the AP MLD over a second communication link, the second beacon frame including the DTIM indicating the transmission of the group data over the second communication link during a time period that at least partially overlaps with the first beacon interval;
obtain the group data from the AP MLD over the first communication link and the second communication link in accordance with the first beacon frame and the second beacon frame indicating the transmission of the group data over the first communication link and the second communication link, respectively, wherein one or more first packets of the group data received over the first communication link have a same sequence number as one or more second packets of the group data received over the second communication link; and
combine one or more packets of the group data received over the second communication link with a set of packets of the group data received over the first communication link, wherein the one or more packets received over the second communication link have sequence numbers that match one or more missing sequence numbers among the set of packets of the group data received over the first communication link.

9. The wireless communication device of claim 8, wherein the wireless communication device is a multi-radio Extremely High Throughput (EHT) device.

10. The wireless communication device of claim 8, wherein the instructions, when executed by the one or more processors, are further configured to cause the wireless communication device to:
remain on the first communication link and the second communication link for a duration of a beacon interval associated with the first beacon frame or the second beacon frame.

11. The wireless communication device of claim 8, wherein the first beacon frame and the second beacon frame are independently received over each of the first communication link and the second communication link.

12. The wireless communication device of claim 8, wherein the instructions, when executed by the one or more processors, are further configured to cause the wireless communication device to:
identify duplicate group data among the group data received over each of the first communication link and the second communication link; and
discard the duplicate group data.

13. The wireless communication device of claim 12, wherein the duplicate group data is identified in response to at least one of a transmitter address, a receiver address, or a sequence number of the group data.

14. The wireless communication device of claim 8, wherein the instructions, when executed by the one or more processors, are further configured to cause the wireless communication device to:
transmit an indication of a preferred communication link to the AP MLD in at least one of a frame or an information element, the preferred communication link being one of the first communication link or the second communication link.

15. A method for wireless communication performed by an apparatus of a wireless station (STA), the method comprising:
obtaining a first beacon frame from an access point (AP) multi-link device (MLD) (AP MLD) over a first communication link at a start of a first beacon interval, the first beacon frame including a delivery traffic indication map (DTIM) indicating a transmission of group data over the first communication link during the first beacon interval;
obtaining a second beacon frame from the AP MLD over a second communication link, the second beacon frame including the DTIM indicating the transmission of the group data over the second communication link during a time period that at least partially overlaps with the first beacon interval;
obtaining the group data from the AP MLD over the first communication link and the second communication link in accordance with the first beacon frame and the second beacon frame indicating the transmission of the group data over the first communication link and the second communication link, respectively, wherein one or more first packets of the group data transmitted over the first communication link have a same sequence number as one or more second packets of the group data transmitted over the second communication link; and combining one or more packets of the group data received over the second communication link with a set of packets of the group data received over the first communication link, wherein the one or more packets received over the second communication link have sequence numbers that match one or more missing sequence numbers among the set of packets of the group data received over the first communication link.

16. The method of claim 15, further comprising:

transmitting an indication of a preferred communication link to the AP MLD in at least one of a frame or an information element, the preferred communication link being one of the first communication link or the second communication link.

* * * * *